US009500177B2

(12) United States Patent
Smith

(10) Patent No.: US 9,500,177 B2
(45) Date of Patent: *Nov. 22, 2016

(54) ELECTRICAL GENERATION SYSTEM BASED ON TIDAL FLOW

(71) Applicant: Tidal Fan, LLC, North Wales, PA (US)

(72) Inventor: Bradley Smith, North Wales, PA (US)

(73) Assignee: Tidal Fan, LLC, West Point, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,481

(22) Filed: Dec. 31, 2015

(65) Prior Publication Data

US 2016/0138558 A1 May 19, 2016

Related U.S. Application Data

(63) Continuation of application No. 14/406,220, filed as application No. PCT/US2014/048184 on Jul. 25, 2014, now Pat. No. 9,243,608.
(Continued)

(51) Int. Cl.
*F03B 13/10* (2006.01)
*F03B 13/12* (2006.01)
(Continued)

(52) U.S. Cl.
CPC ............ *F03B 13/264* (2013.01); *E02B 9/08* (2013.01); *F03B 13/26* (2013.01); *F03B 13/268* (2013.01);
(Continued)

(58) Field of Classification Search
USPC .................................................... 290/53, 54
See application file for complete search history.

(56) References Cited

U.S. PATENT DOCUMENTS 1,457,170 A   5/1922 Huguenin
3,426,540 A   2/1969 Fixel
(Continued)

FOREIGN PATENT DOCUMENTS

DE   102006040675   11/2001
DE   102006040675   11/2007
(Continued)

OTHER PUBLICATIONS

PCT/US14/48184 Notification of Transmittal of the International Search Report and The Written Opinion of the International Searching Authority, or the Declaration, mailed Nov. 4, 2014 (12 pages).
(Continued)

*Primary Examiner* — Pedro J Cuevas
(74) *Attorney, Agent, or Firm* — Joseph E. Maenner; Maenner & Associates, LLC

(57) ABSTRACT

An electrical generation system based on tidal flow includes a reservoir and a fluid inlet tube extending between a tidal source and the reservoir. The inlet tube has at least one inlet turbine generator disposed therein. The fluid inlet tube extends along a first level. A fluid outlet tube extends between the reservoir and the tidal source. The fluid outlet tube has at least one outlet turbine generator disposed therein. The fluid outlet tube extends along a second level vertically lower than the first level. During high tide at the tidal source, tidal fluid flows from the tidal source, into the fluid inlet tube, past the at least one inlet turbine generator, and into the reservoir and during a low tide at the tidal source, the tidal fluid flows from the reservoir, into the fluid outlet tube, past the at least one outlet turbine generator, and to the tidal source.

21 Claims, 9 Drawing Sheets

Related U.S. Application Data

(60) Provisional application No. 61/868,182, filed on Jul. 25, 2013.

(51) Int. Cl.
  H02P 9/04 (2006.01)
  F03B 13/26 (2006.01)
  E02B 9/08 (2006.01)
  H02K 7/18 (2006.01)

(52) U.S. Cl.
  CPC ............ H02K 7/1823 (2013.01); *Y02E 10/28* (2013.01); *Y02E 10/38* (2013.01)

(56) References Cited

U.S. PATENT DOCUMENTS

| | | |
|---|---|---|
| 3,993,913 A | 11/1976 | Dickman |
| 4,039,847 A | 8/1977 | Diggs |
| 4,104,536 A | 8/1978 | Gutsfield |
| 4,288,985 A | 9/1981 | Dyck |
| 4,327,297 A | 4/1982 | Harrison |
| 4,369,375 A | 1/1983 | Romano |
| 4,421,990 A * | 12/1983 | Heuss ............. F03B 13/268 105/76 |
| 4,569,200 A * | 2/1986 | Lamb ............. F03B 13/268 405/76 |
| 4,717,831 A | 1/1988 | Kikuchi |
| 4,859,866 A | 8/1989 | Horne et al. |
| 5,825,094 A | 10/1998 | Hess |
| 6,546,723 B1 | 4/2003 | Watten et al. |
| 6,792,753 B2 | 9/2004 | Hastings |
| 6,863,028 B2 | 3/2005 | Sherman |
| 6,930,406 B2 | 8/2005 | Montgomery |
| 6,955,049 B2 | 10/2005 | Krouse |
| 6,967,413 B2 | 11/2005 | Atiya |
| 7,078,827 B2 | 7/2006 | Brewington |
| 7,391,127 B2 * | 6/2008 | Ayntrazi ............... F03B 13/189 290/42 |
| 7,768,144 B2 | 8/2010 | North et al. |
| 7,877,992 B2 * | 2/2011 | Chen .................. F03B 13/06 60/398 |
| 8,591,178 B2 | 11/2013 | DeMontmorency |
| 2006/0097520 A1 * | 5/2006 | Ayntrazi ............... F03B 13/189 290/53 |
| 2009/0293469 A1 * | 12/2009 | Chen .................. F03B 13/06 60/398 |
| 2015/0167628 A1 * | 6/2015 | Potts ................... F03B 13/145 290/53 |

FOREIGN PATENT DOCUMENTS

| | | |
|---|---|---|
| DE | 102007011350 | 8/2008 |
| DE | 102008009453 | 8/2008 |
| DE | 102008009453 | 8/2009 |
| ES | 2169006 | 1/2000 |
| ES | 2169006 | 6/2002 |
| GB | 219323 | 1/1925 |
| WO | WO2008/084560 | 1/2008 |

OTHER PUBLICATIONS

International Preliminary Report on Patentability for PCT/US2014/048184, mailed Jan. 26, 2016. 9 pages.

* cited by examiner

ELECTRICAL GENERATION SYSTEM BASED ON TIDAL FLOW

CROSS-REFERENCE TO RELATED APPLICATION

The present application is a Continuation Application of U.S. patent application Ser. No. 14/406,220, filed on Dec. 7, 2014, which is a 371 of PCT application PCT/US14/48184, filed on Jul. 25, 2014, which claims priority from U.S. Provisional Patent Application Ser. No. 61/858,182, filed on Jul. 25, 2013, all of which are incorporated by reference in their entireties.

FIELD OF THE INVENTION

The present invention is directed to a system and method for generating electricity based on tidal flow.

BACKGROUND OF THE INVENTION

Water turbines can be used to generate electrical power by harnessing the hydraulic power generated by tidal flow. Because tidal effects are known at locations throughout the world, including the time and approximate height of both high and low tides, electrical power generation systems that use water turbines to generate electricity by tidal flow can be developed. Tidal flow characteristics, however, do vary at a particular location. While a tidal flow-based electrical generation system can be developed that takes into account general characteristics of the tidal values, variations in tidal heights that that location can result in less than optimum electrical generation.

It would be beneficial to provide an electrical generation system that optimizes tidal flow characteristics.

BRIEF SUMMARY OF THE INVENTION

Briefly, the present invention provides a system and method for producing electrical energy based on tidal flow. The system includes a reservoir for receiving and retaining tidal flow waters from the sea at high tide and for discharging the tidal waters at low tide. The system also includes a first flow tube for receiving and directing water into the reservoir at high tide. At least one turbine generator is located inside the first flow tube. A second flow tube directs water from the reservoir back to the sea at low tide. At least one turbine generator is located inside the second flow tube.

In an exemplary embodiment, the reservoir may be vertically movable based on the amount of water inside the reservoir as well as the height of the high tide and the low tide. Additionally, in another exemplary embodiment, the first and second flow tubes may be vertically adjustable based on the height of the high and low tides.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
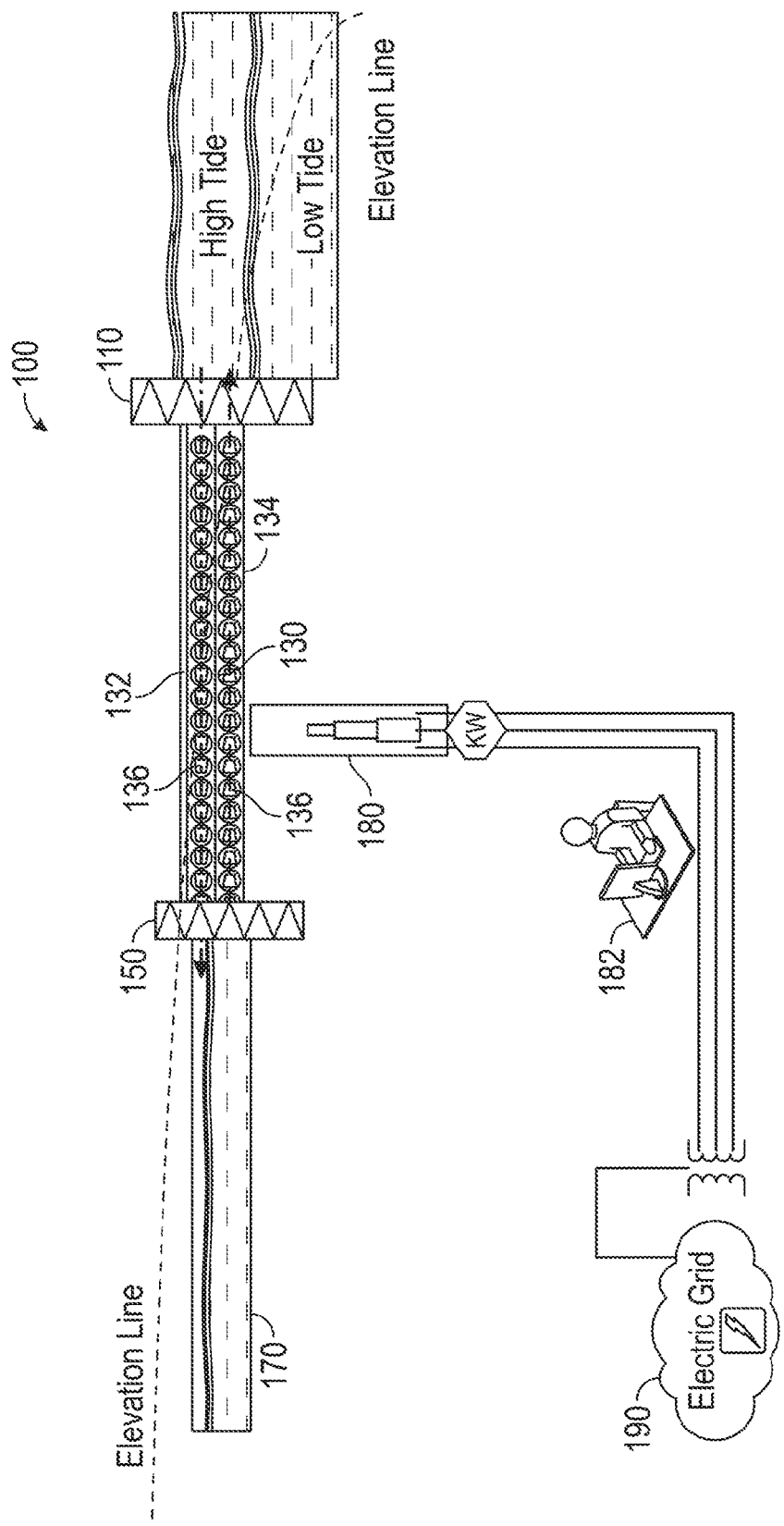
FIG. 1 is a schematic view of a first exemplary embodiment of an electrical generation system according to the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The present invention uses tidal flow to operate a plurality of water turbines, which, in turn, generate electricity. Rising tidal waters are directed from a tidal water supply, through a first turbine tube containing a first set of water turbines, and to a storage reservoir. Similarly, lowering tidal waters are directed from the storage reservoir, through a second turbine tube to a second set of water turbines, and back out to the title water supply. In an exemplary embodiment, a tidal flux of about 5 feet is a minimum tidal flux desired in order to use the inventive system.

Electrical generation will occur during the two periods of water flow over the turbines. These two periods can be accurately predicted each day, and are guaranteed to occur. The approximately duration could be between two and about five hours each, depending on location.

Additionally, the location of the inventive system is not dependent on geography and can be a self-contained system that can be installed anywhere with a tidal flow. The inventive system will likely extend outward into a tidal basin or ocean and may be used as a jetty, a breakwater, or other relatively environmentally friendly addition to a coastline.

Output of the inventive system depends on sustained head (water pressure) over each of the turbines in each turbine tube, generated by the difference in elevation between tidal water and the turbine tubes, which is directly proportional to the amount of fluctuation between maximum and minimum sea level due to tides. Locations with greater vertical distance between high and low tides will produce more output because of the presence of more head pressure in the system.

Generally, tidal fluctuation increases with distance from the equator, although there are other factors as well. As a result, location is a major factor in the determination of where to install the inventive system.

Referring to FIG. 1, an electrical generation system 100 according to a first embodiment of the present invention is shown. System 100 includes a tidal water interface 110, which controls tidal water flow from a tidal water interface 110 into and out of system 100; a turbine tube assembly 130, which contains the water turbines that are operated by tidal water flow to generate electricity; a reservoir interface 150, which controls tidal water flow from a reservoir 170; and reservoir 170, which receives and stores the tidal water at high tide and provides a water supply, and returns the tidal water back to the tidal water basin 102. System 100 may be coupled via an electrical generation system 180 to an electrical grid 190 that is used to distribute electricity generated by operation of system 100.

Figure 2:
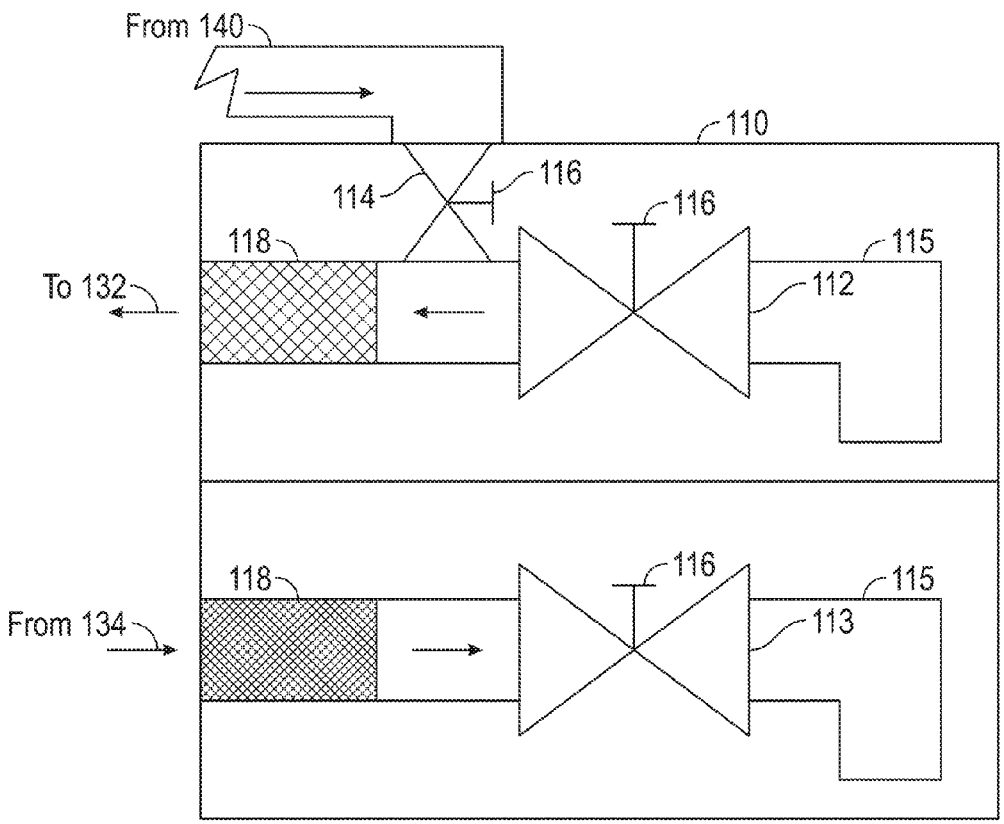
FIG. 2 is a schematic view of a tidal water interface used with the electrical generation system shown in FIG. 1.

Referring to FIG. 2, tidal water interface 110 may include valves 112-114, controls 116, and filters 118. In an exemplary method, valve 113 is only open during low tide. Additionally, tidal water interface 110 may include a pool in front of filters 118 that is relatively still and free from wave action. Because such a pool is easily filled by or empties into the surrounding tidal waters, the mean height of that pool will be equal to the mean height of the surrounding tide. Additionally, tidal water interface 110 protects system 100 from significant wave and storm action. To further protect against wave action, elbows 115 can be located on the tidal side of valves 112, 113 to force tidal water into elbows 115 from the bottom, and to force the tidal water to make a 90 degree turn prior to reaching valve 112 for tidal water entering system 100 and after exiting valve 113 for tidal water leaving system 100.

Filters 118 are used to screen out foreign material, organic or otherwise, that may harm other components and devices in system 100 (such as the valves and turbines). Tidal water interface 110 also protects system 100 from significant wave and storm action. Further, tidal water interface 110 provides a pool of water that is free from harmful objects and that is relatively still (i.e., no significant wave action). Because tidal water interface 110 is easily filled by or emptied into the surrounding waters, the mean height of the water therein is generally equal to the mean height of the surrounding tide. Such pooling effect without wave action enables the high tide water to submerge an upper turbine tube 132 and flow through at maximum pressure and the low tide water to not obstruct flow back into the tidal water from system 100.

Referring back to FIG. 1, turbine tube assembly 130 includes one or more pairs of tubes 132, 134, each of which house a horizontal series of water turbines 136 that are used to generate electricity. Turbine tube 132 with the higher elevation is the high tide tube, while turbine tube 134 with the lower elevation is the low tide tube.

Upper turbine tube 132 receives tidal water from tidal water interface 110 during high tide. During high tide, valve 112 is open to allow tidal water into upper turbine tube 132, while valve 113 is closed to prevent tidal water from entering lower turbine tube 134.

Figures 3A, 3B, 3C:
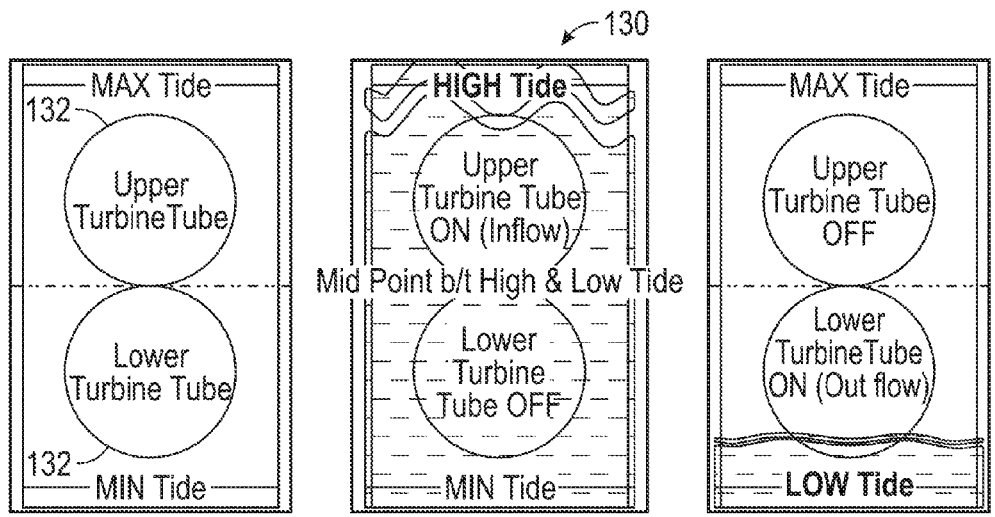
FIG. 3A is a front elevational view of turbine tubes used with the electrical system shown in FIG. 1.
FIG. 3B is a front elevational view of the turbine tubes shown in FIG. 3A at high tide.
FIG. 3C is a front elevational view of the turbine tubes of FIG. 3A at low tide.

As shown in FIGS. 3A-3C, in an exemplary embodiment, the highest elevation of tube 132 is at maximum high tide elevation, so that turbine tube 132 can be completely submerged at high tide. During this time, reservoir 170 fills up with water that flows though upper turbine tube 132. In one embodiment, water in reservoir 170 only fills up to the tide's mid point level. At low tide, the water in reservoir 170 can now be allowed to exit system 100. The elevation of reservoir 170 is higher than that of lower turbine tube 134, such that water from reservoir 130 exits through lower turbine tube 134.

The top of the elevation of lower turbine tube 134 is equal to the bottom elevation of upper turbine tube 132, or, at the midpoint of low and high tide. Tube 132 has a diameter such that the bottom of tube 132 is at the midpoint of low and high tide. If top of tube 132 is completely submerged at high tide, maximum flow is achieved due to maximum difference in atmospheric pressure pushing on the pool of water at tidal water interface 102 and the empty reservoir 170 at the other end of tube 132.

The elevation of lower tube 134 is just above low tide, such that flow out of tube 134 is not obstructed by tidal water. Maximum flow (and electrical output) can occur due to the difference in atmospheric pressure on the water in reservoir 170 versus the pressure of the empty space at tidal water interface 102 created by low tide.

In an exemplary embodiment, tubes 132, 134 can be perfectly horizontal. The dimensions and elevations of tubes 132, 134 take advantage the location's tidal flux. Maximum output of system 100 occurs when the diameter of each tube 132, 134 is approximately one half of the flux, and tube assembly 130 is located within the flux elevations.

Referring back to FIG. 1, turbines 136 can be identical in both tubes 132, 134, and may be designed and manufactured for only one-direction of flow. Turbines 136 in upper tube 132 are arranged for flow from right to left as shown in FIG. 1, while turbines 136 in lower tube 134 are arranged for flow from left to right as shown in FIG. 1 such that water will only flow past turbines 136 in one direction.

Turbine spin rate (and electricity generation) is directly related to height differential between tides (tidal flux). Atmospheric pressure forces the tidal water to a lower elevation by flowing through turbine tubes 132, 134 (depending on whether the tide is flowing in at high tide or flowing out at low tide) and past the turbine blades. A larger tidal flux creates a greater a height differential, enabling a larger volume of water to flow from a higher elevation to a lower elevation, through turbine tubes 132, 134. More pressure per square unit can be exerted on the turbine blades with increasing tidal flux and available volume of water.

The basic concept stands: What flows in at high tide, must flow out at low tide. Turbines 136 generate electricity on the flow in and the flow out. The turbines' blades fill up the space inside each tube 132, 134, and rotate as the tidal water flows over them, in both directions. Each turbine 136 in a respective turbine tube 132, 134 is positioned for the one direction the water will flow. Turbines 136 in upper turbine tube 132 are pointed for the tidal water flow into system 100, while turbines 136 in lower turbine tune 134 are pointed in the opposite direction for flow out of system 100. Upper turbine tube 132 carries tidal water flow reservoir 170 at high tide, causing turbines 136 in upper turbine tube 132 to rotate. Lower turbine tube 134 carries tidal water out of reservoir 170 at low tide, causing turbines 136 in lower turbine tube 134 to rotate. In between tides, no water is flowing through either tube 132, 134, and no electricity is being generated.

While one pair of turbine tubes 132, 134 is shown, those skilled in the art will recognize that system 100 may include more than one pair of turbine tubes 132, 134. Regardless of the number of turbine tubes 132, 134, it is understood that reservoir 170 has to be large enough to handle the volume of tidal water allowed to enter system 100.

While turbine tubes 132, 134 are each shown as one contiguous tube, those skilled in the art will recognize that turbine tubes 132, 134 can be built in sections, with one turbine 136 located in each section, such that, if required, a tube section can be removed to perform maintenance on the turbine.

Referring now to FIGS. 1 and 3A-3B, reservoir 170 receives the tidal water that flows through upper turbine tube 132 at high tide. Like turbine tubes 132, 134, it is desired that reservoir assembly 170 also has exact elevations. The collected tidal water must be able to return to tidal water interface 110 at low tide by virtue of being at a higher elevation in reservoir assembly 170 than tidal water interface 110 at low tide.

Figure 4:
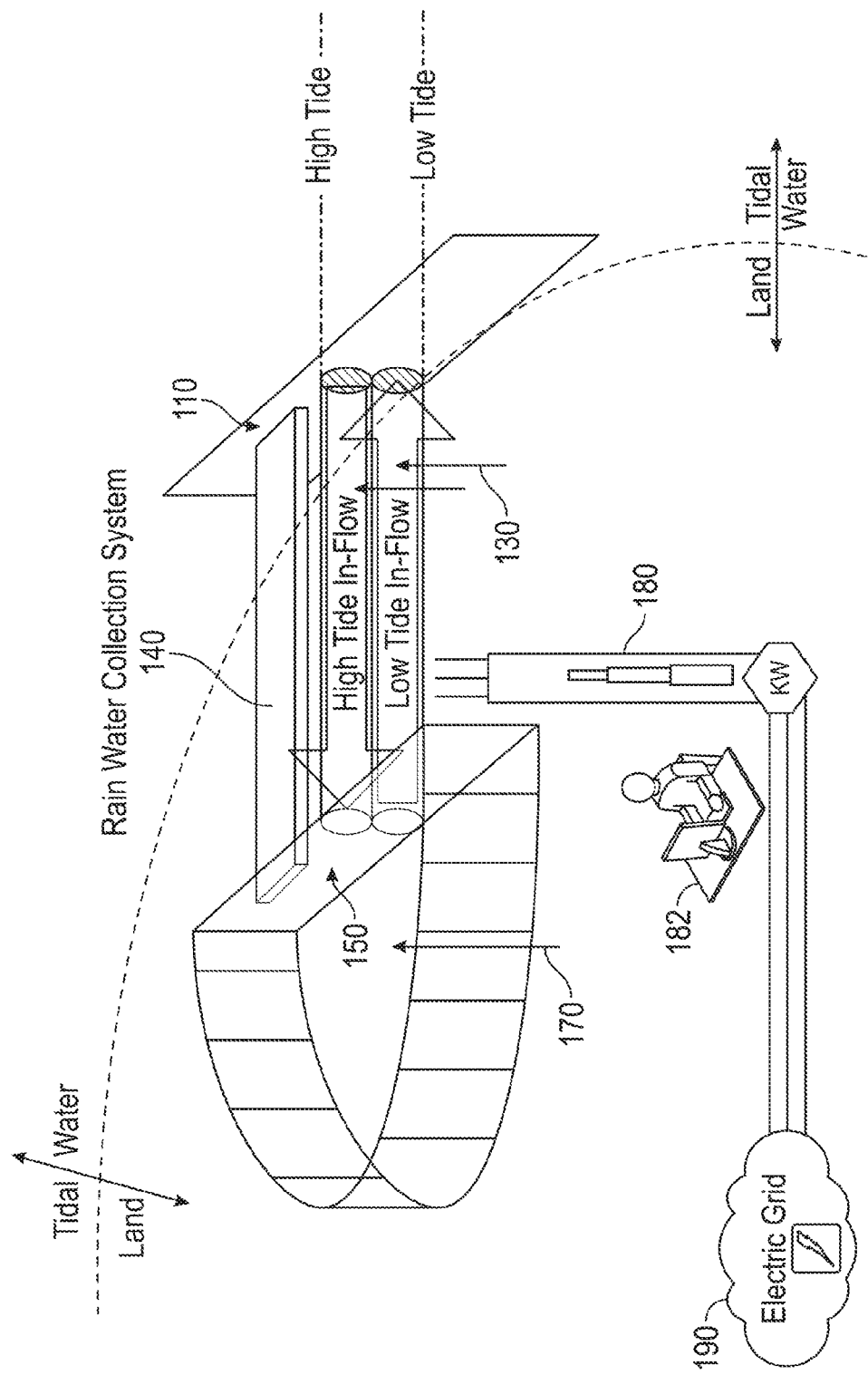
FIG. 4 is a schematic view of a second exemplary embodiment of an electrical generation system according to the present invention.

Optionally, as shown FIG. 4, system 100 can include a rain water collection system 140 that may use to flush turbine tubes 132, 134, as well as turbines 136. Turbines 136, valves 112, 113, and other components of system 100 come in contact with tidal water (seawater) during the inflow and outflow processes during operation of system 100. Due to corrosive nature of this type of water, critical subcomponents of system 100 will benefit if flushed periodically by rain water. Rain water is assumed to be "clean" enough water to remove tidal water particles that, if left alone, can cause damage over time. Rain water collected naturally also reduces the need for system 100 to be connected to costly public water.

Figure 5:
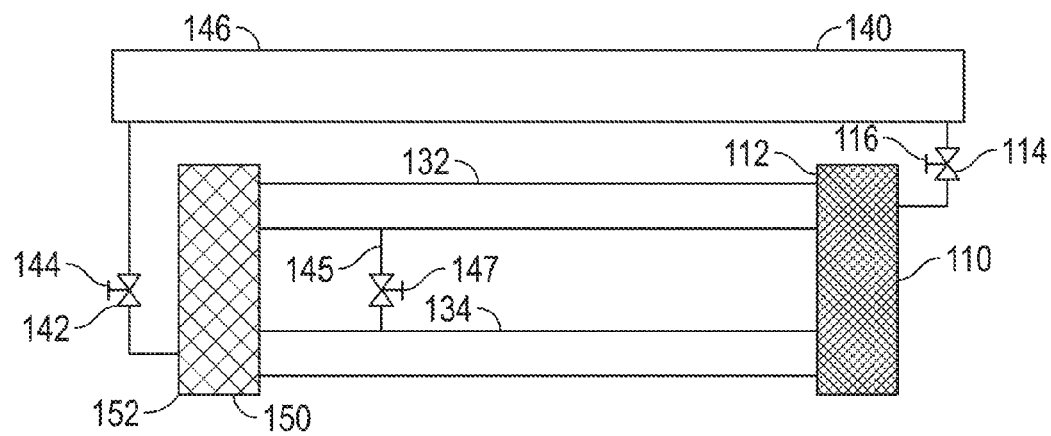
FIG. 5 is a schematic view of a tidal interface according to an exemplary embodiment of the present invention.

Rain water collection system 140 includes a flushing reservoir that collects and stores rain water vertically above the elevation of inlet turbine tube 132. Rain water is held back from entering turbine tubes 132, 134 by valves 114, 142, 145 and controls 116, 144, 147, as shown in FIG. 5.

In an exemplary embodiment, no seawater is in turbine tubes 132, 134 during the flush. A mixture of seawater with the flushing rainwater offsets the "pure" and cleansing effects of the salt free rainwater. Typically, valves 114, 142 are closed, retaining rainwater in a rainwater collecting basin 146. Several cycles of operation of system 100 may go by (i.e., days, weeks) without any flushing. A system operator determines a desired time to flush either upper tube 132 or lower tube 134, depending on perceived cleanliness of either tube 132, 134, as well as the quantity of rain water that is in rain water basin 146. In a practical scenario, flushing can be alternated between upper tube 132 and lower tube 134 such that rain water collection system 140 is alternately in fluid communication with either inlet tube 132 or outlet tube 134. While upper tube 132 and lower tube 134 are being flushed, filters 118, 156, 159 can optionally be flushed as well.

The valve system will control when and how much rain water can enter either turbine tube 132, 134. When the valves open, "clean" rain water will flow over and through the components, flushing off tidal water particles. An exemplary time for this to occur is when there is no tidal water in tubes 132, 134, which is in between cycles of inflow & outflow (in between high tide and low tide). However, this water can also be combined with the tidal water flow to contribute to the generation of electricity. If excess rain water is collected, that water can be released into either end of system 100. Using controller 147 to operate valve 145 can direct rain water from tube 132 directly to tube 134. Releasing excess rain water into system 100 at the end of high tide (the inflow cycle) can extend the duration of the electricity generation because the rain water flows in, rotating turbines 136 inside tube 132, and then flows out to the sea, also rotating turbines 136 inside tube 134. Because the rain water is less dense than tidal water, the rainwater will not turn turbines 136 as fast as tidal water. Therefore, system operations can call for the rain water release only at optimal times.

Rainwater collection system 140 is constructed above the elevation of turbine tubes 132, 134 so that, once valves 114, 144 are opened, gravity is the only force needed to flush system 100. Rainwater collection system 140 can be at a fixed elevation, as there is no need for rainwater collection system 140 to be raised or lowered. No energy should be needed to collect the rain water, but an optional filtration system built into may accompany the collection process to ensure no harmful materials or particles are collected that can be released further into system 100. Finally, rain water collection system 140 can be designed as a "closed" collection system, to minimize rain water escape due to evaporation.

In an exemplary method, valves 114, 144 only open during low tide. To cleanse upper turbine tube 132, valve 114 is opened at low tide, usually when there is flow out from reservoir 170, or because reservoir 170 is otherwise empty. During this phase, there is no seawater present in upper turbine tube 132. The flushing rainwater enters upper turbine tube 132 at filters 112 and flows past turbines 136 in upper turbine tube 132, cleansing turbines 136 and upper turbine tube 132. The rainwater then flows into reservoir 170, where the rainwater can be stored until discharged through lower turbine tube 134 and out to sea.

To cleanse lower turbine tube 134, valve 142 is opened at low tide, after any water from reservoir 170 has flowed through lower turbine tube 134 and out to sea. The flushing rainwater enters lower turbine tube 134 at filters 152 and flows past turbines 136 in lower turbine tube 134, cleansing turbines 136 and lower turbine tube 134. The rainwater then flows out to sea.

Figure 6:
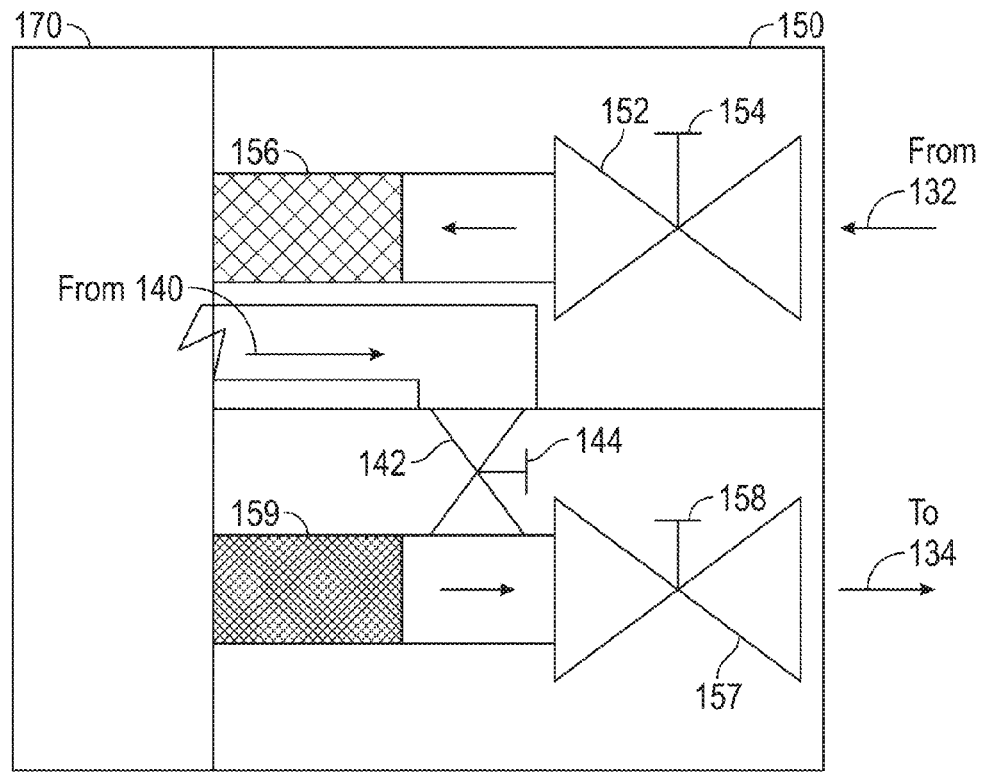
FIG. 6 is a schematic view of a reservoir interface according to an exemplary embodiment of the present invention.

Reservoir interface 150 is shown in more detail in FIG. 6. Reservoir interface 150 includes a valve 152 that is in fluid communication with upper turbine tube 132 and can be closed via a controller 154. Valve 152 can be closed to isolate upper turbine tube 132 from reservoir 170. A filter 156 is located downstream of valve 152 and can be used to filter any contaminants not captured by filter 118 in tidal water interface 110.

Reservoir interface 150 also includes a valve 157 that is in fluid communication with lower turbine tube 134, and can be closed via a controller 158. A filter 159 is located upstream of valve 157 and can be used to filter any contaminants flowing from reservoir 170. A valve 142 provides fluid communication between rainwater collecting system 140 and valve 157 to allow rainwater from rainwater collecting system 140 to flow through and flush lower turbine tube 134 when valve 142 is open. Valve 142 includes a controller 144 that is used to open and close valve 142.

Alternatively, although not shown, valve 142 may be in fluid communication with reservoir 170 and may also flush any contaminants in reservoir 170 to filter 159 prior to flushing lower turbine tube 134.

Referring back to FIG. 1, reservoir 170 is used to collect tidal water flowing through upper turbine tube 132 from the sea during high tide and to return to tidal water to the sea through lower turbine tube 134 during low tide. Reservoir 170 may be an open container. Alternatively, reservoir 170 may be covered in order to restrict entry of debris into reservoir 170 from the external environment. Further, as shown FIG. 1, reservoir 170 may be located below a soil elevation line, meaning that reservoir 170 is buried below ground level.

Although not shown, a control structure may be located within the proximity of system 100 that houses all of the controls for operation of system 100. An operator 182 located within the control structure may manually control operation of system 100 by opening and closing valves 112, 113, 114, 142, 152, 154 to allow or restrict water flow through turbine tube assembly 130. Additionally, operator 182 monitors operation of turbines 136 to ensure proper operation of turbines 136 and generation of electricity. Electric grid 190 is electrically connected to turbines 136 via electrical generation system 180 and captures and transmits electrical energy generated by turbines 136 for transmission and eventual use.

High and low tides are not exactly the same mean elevation every cycle (24 hours, 52 minutes). The location of the sun and moon in relation to the earth affect these levels. Other factors are at play as well, such as the geography of the sea floor near the area, as well as weather conditions. If the elevations of turbine tubes 132, 134 are fixed, they might not be at the absolute optimal vertical positions for the current tidal cycle.

Figure 6A:
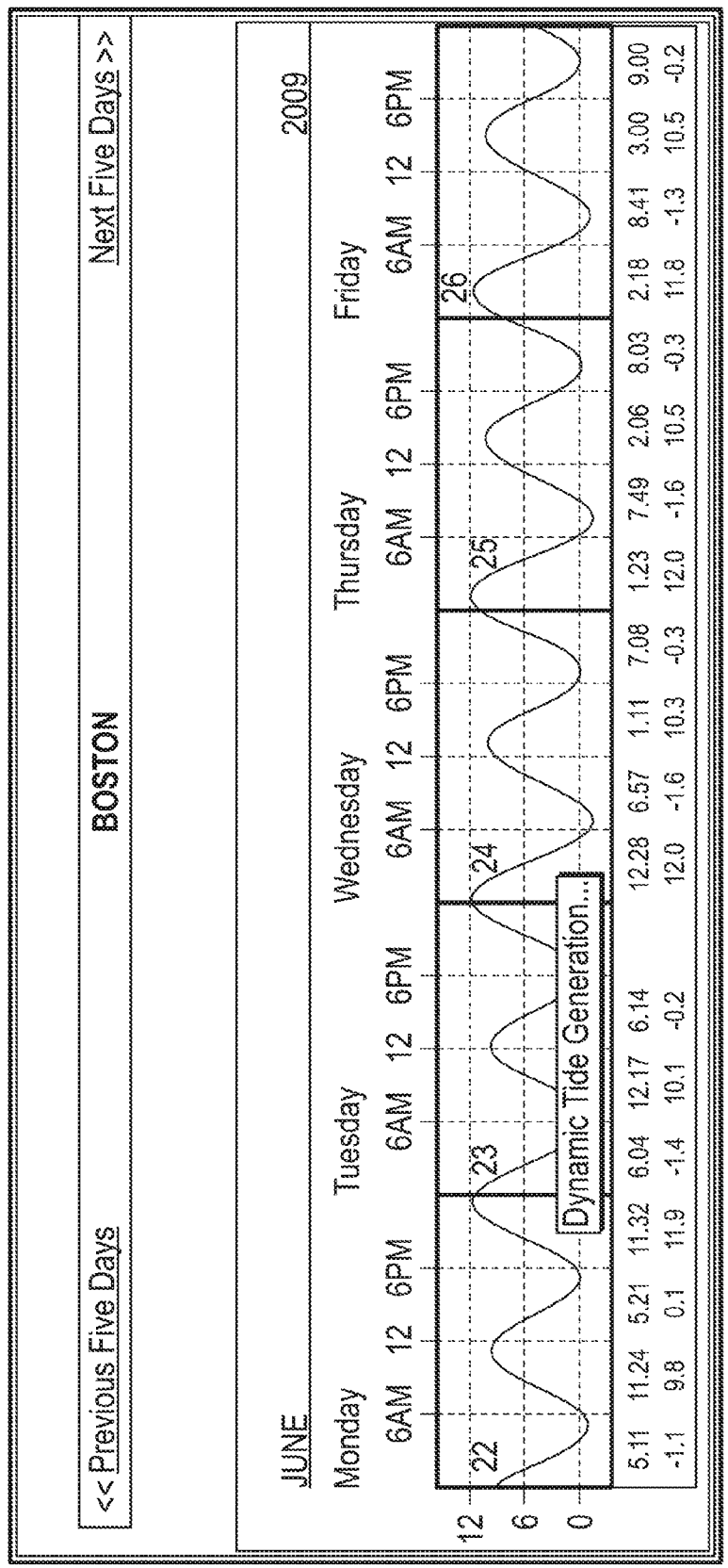
FIG. 6A is a graph showing tide fluctuations at a given location over a period of time.

A vertical movement of turbine tubes 132, 134 will allow for fine tuning of the elevation of turbine tubes 132, 134 to accommodate different mean elevation levels. While a standard height of high tide and low tide for particular location may be known, the heights do vary, such as, during periods of severe weather that may generate tidal surges, increasing the height of high and/or low tide. For example, as shown in FIG. 6A, an exemplary high tide chart for a particular location, in this case, Boston, Mass., illustrates that, while high tide is generally around 10 feet, high tide fluctuates between about 9 feet and about 11 feet. Similarly, low tide may fluctuate about 1 or 2 feet.

Figure 6B:
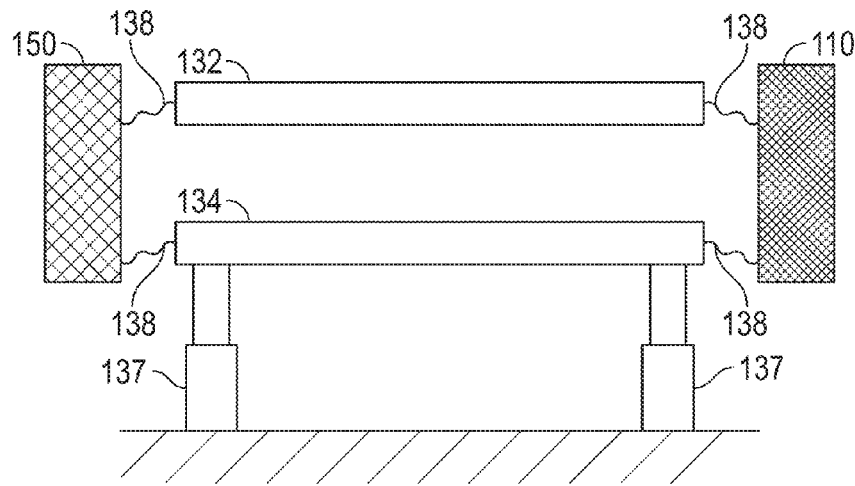
FIG. 6B is a side elevational view of a turbine tube lift system according to an exemplary embodiment of the present invention.

As shown in FIG. 6B, in order to accommodate for such fluctuation, turbine tubes 132, 134 can optionally be vertically adjusted to account for varying tidal heights at the particular location. Turbine tubes 132, 134 may be mounted on hydraulic pistons 137 that are computer programmed or controlled by operator 182 in order to raise and lower in order to optimize the level of turbine tubes 132, 134 relative to the actual tidal height or maximum projected tidal height. The raising of turbine tubes 132 can be done before allowing tidal flow into turbine tubes 132 and the lowering of turbine tubes 134 can be done before allowing tidal flow out of reservoir 170 and into turbine tubes 134. While hydraulic pistons 137 are shown, those skilled in the art will recognize that other lifting mechanisms may be used to adjust the vertical height of turbine tubes 132, 134. For example, a spring mechanism or other biasing member may be used to support turbine tubes 132, 134. Springs (not shown) may be at maximum extension, with the dry weight of each tube 132, 134 and the turbines 136 inside the respective tubes 132, 134 partially compressing the springs to a maximum respective tidal height. To accommodate a lower tidal height, the springs may be compressed further by pulling down on each of tubes 132, 134 as required. Such pulling may be by linear screw drives (not shown) or winched cables connected to the bottoms of tubes 132, 134. To raise tubes 132, 134, the screw drive may be reversed or the cable may be released. Those skilled in the art will recognize that such mechanisms are exemplary only, and numerous other suitable mechanisms may be used to raise/lower tubes 132, 134.

Further, instead of a hard connection between turbine tubes 132, 134 and tidal water interface 110, as well as reservoir interface 150, a "soft" connection may be provided. Such a soft connection may be in the form of flexible tubes 138 or other flexible connections at either end of turbine tubes 132, 134 that maintain fluid communication between turbine tubes 132, 134 and tidal water interface 110 and reservoir interface 150 as turbine tubes 132, 134 raise and lower. It is desired that turbine tubes 132, 134 remain horizontally level at all times.

Figure 7:
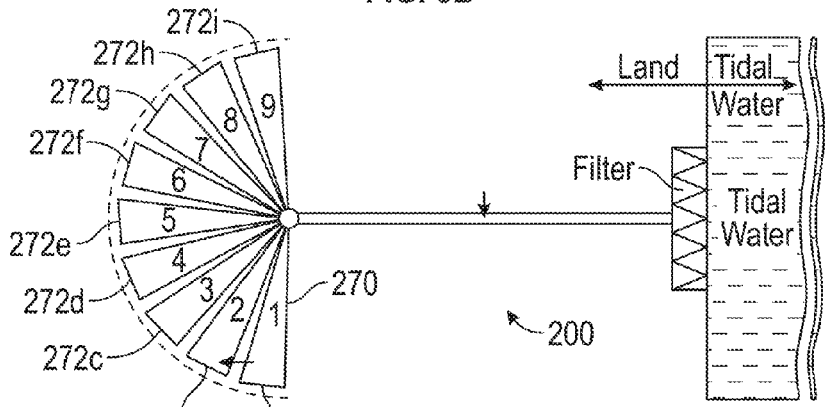
FIG. 7 is a schematic view of a second exemplary embodiment of an electrical generation system according to the present invention.

In an alternative embodiment of a system 200 according to the present invention, shown FIG. 7, instead of a single reservoir 170, a reservoir 270 can be an array of static, equally subdivided reservoirs 272a-272i, forming separate chambers. Although nine reservoirs 272a-272i are shown, those skilled in the art will recognize that more or less than nine reservoirs 272a-272i may be used. As shown FIG. 7, reservoirs 272a-272i are distributed in an exemplary fan pattern, although those skilled in the art will recognize that other patterns and configurations of reservoirs 272a-272i may be used. Each of individual reservoirs 272a-272i are connected to reservoir interface 150, such as through individual valves (not shown).

A benefit of the multiple reservoirs 272a-272i is to allow for sequential valve-initiated control over the inflow and outflow of tidal water, as well as better operations and maintenance of the system (e.g. individual reservoirs can be closed for maintenance, cleaning, etc.). For example, reservoir 272a may fill first and then, when reservoir 272a is approximately 95% capacity, a valve (not shown) between reservoir 272a and reservoir interface 150 closes, while a valve (not shown) between reservoir 272b and reservoir interface 150 opens, precluding the tidal flow from entering reservoir 272a and allowing the tidal flow to enter reservoir 272b. The total volume of reservoirs 272a-272i is at least sufficient to receive and retain all of the water flowing through system 200 at high tide. Alternatively, other operational configurations can be used. By way of example only, because of differing head pressure due to the height of the tide, reservoirs 272a-c can be sequentially filled, then reservoirs 272d-f can be simultaneously filled, and reservoirs 272g-i can be serially filled.

Similarly, at low tide, each of reservoir 272a-272i can be operated to discharge water sequentially. Alternatively, at least some of reservoirs 272a-272i can be operated to discharge water simultaneously, increasing the flow rate through lower turbine tube 134 and providing more flow through turbines 136 within lower turbine tube 134, if desired. Those skilled in the art will recognize that the operation and emptying of reservoirs 272a-272i can be calibrated to ensure maximum head and fluid flow through turbines 136 in lower turbine tube 134.

Still alternatively, as shown FIGS. 8A-8D a system 300 according to the present invention includes a reservoir system 370 that uses a reservoir 375 that can be mounted and upwardly biased on a biasing member, such as a spring 376, or an array of springs 376 (only one spring 376 shown). Further, while one reservoir 375 is shown, reservoir system 370 contemplates multiple reservoirs 375, similar to reservoirs 272a-272i, shown with respect to reservoir 270. Reservoir system 370 requires connections, such as flexible tubes 378, between reservoir 375 and reservoir interface 150 to account for the change in elevation of reservoir 375 as reservoir 375 fills and empties with tidal water.

Spring-biased reservoirs 375 can extend and control the duration of out-flow of tidal water with inputting any outside energy to direct the water from reservoirs 375 to lower turbine tube 334. Such a feature is desired because extending the duration of out-flow extends the duration of electricity generation. Maximum rotational velocity of turbines 136 is proportional to the amount of head at normal atmospheric pressure, and to electrical output. Spring-biased reservoirs 375 take advantage of the assumption that maximum rotational velocity of turbines 136 is achieved before all reservoirs 375 are simultaneously allowed to exit the system by opening all valves. Valves, such as the valves 157 in reservoir interface 150, are programmed to control this flow from each reservoir 375 sequentially (if more than one reservoir 375 is used), and maximum head/turbine rotational velocity/electrical output can be achieved with just a portion of valves 157 being open.

Figure 8A:
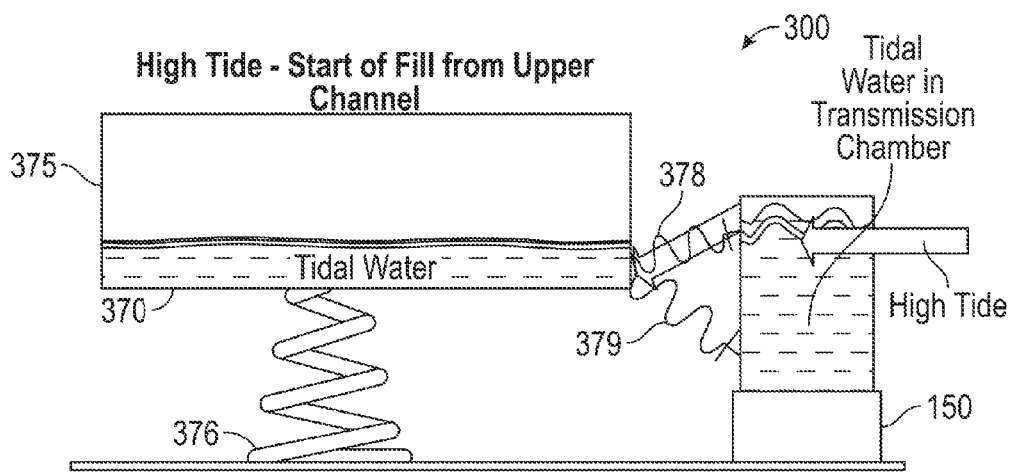
FIG. 8A is a side elevational view of a movable reservoir system at the beginning of high tide according to an exemplary embodiment of the present invention.
Figure 8B:
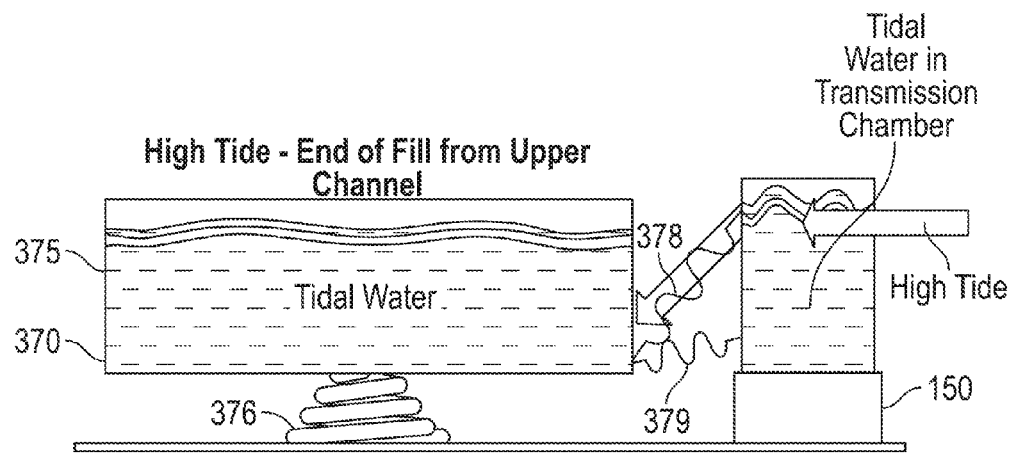
FIG. 8B is a side elevational view of a movable reservoir system at the end of high tide according to an exemplary embodiment of the present invention.

As shown FIG. 8A, tidal water flowing in during high tide flows through reservoir interface 150 and through flexible tube 378 to reservoir 375. As the tidal water enters reservoir 375, weight of the tidal water in reservoir 375 compresses springs 376, lowering reservoir 375 to the position shown in FIG. 8B. Flexible tube 378 is able to move and expand with the movement of reservoir 375, allowing the tidal water to continue flowing into reservoir 375.

In an exemplary embodiment, the discharge of flexible tube 378 remains above the level of fluid in reservoir 375, so the flow from tube 378 into reservoir 375 is never restricted by water in reservoir 375. The discharge end of tube 378 can be mounted on a float 378a so that the discharge end always floats above the surface of fluid within reservoir 375.

Figure 8C:
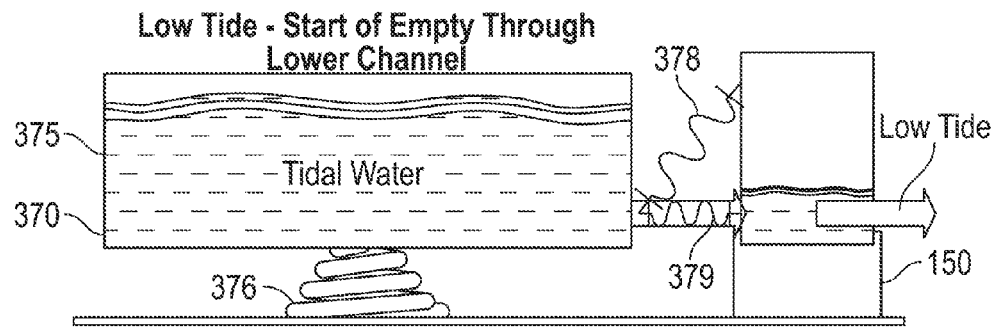
FIG. 8C is a side elevational view of a movable reservoir system at the beginning of low tide according to an exemplary embodiment of the present invention.

As shown in FIG. 8C, the tidal water within reservoir 375 remains within reservoir 375 until low tide. At low tide, the tidal water within reservoir 375 flows through flexible tube 379 and into reservoir interface 150 for discharge through lower turbine tube 134. As the tidal water within reservoir 375 decreases by flowing out of reservoir 375, springs 376 expand, raising reservoir 375 and providing a head to assist discharging the tidal water from reservoir 375.

Figure 8D:
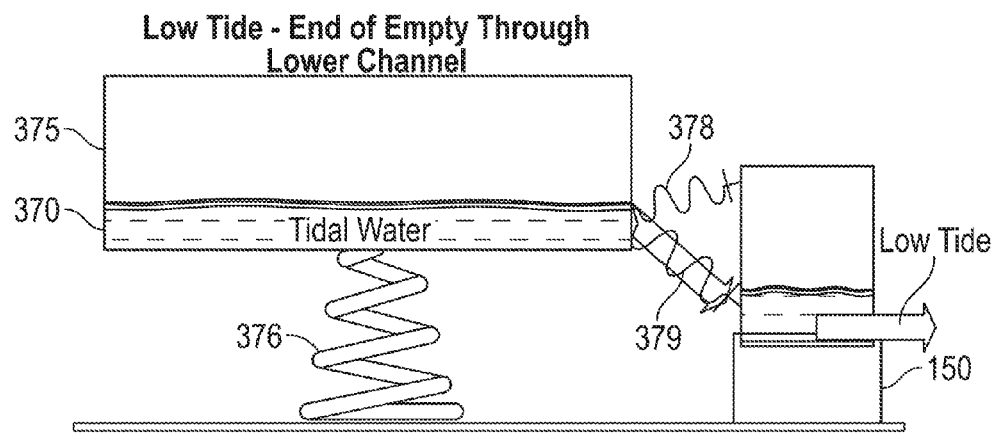
FIG. 8D is a side elevational view of a movable reservoir system at the end of low tide according to an exemplary embodiment of the present invention.

FIG. 8D shows reservoir 375, after having discharged most of the water within reservoir 375, through flexible tube 379 and into reservoir interface 150 for discharge through lower turbine tube 134. In comparison to the location of reservoir 375 shown in FIG. 8C, in FIG. 8D, springs 376 have expanded, vertically raising reservoir 375 to provide a higher head pressure for discharge of the remaining water within reservoir 375.

Figure 9:
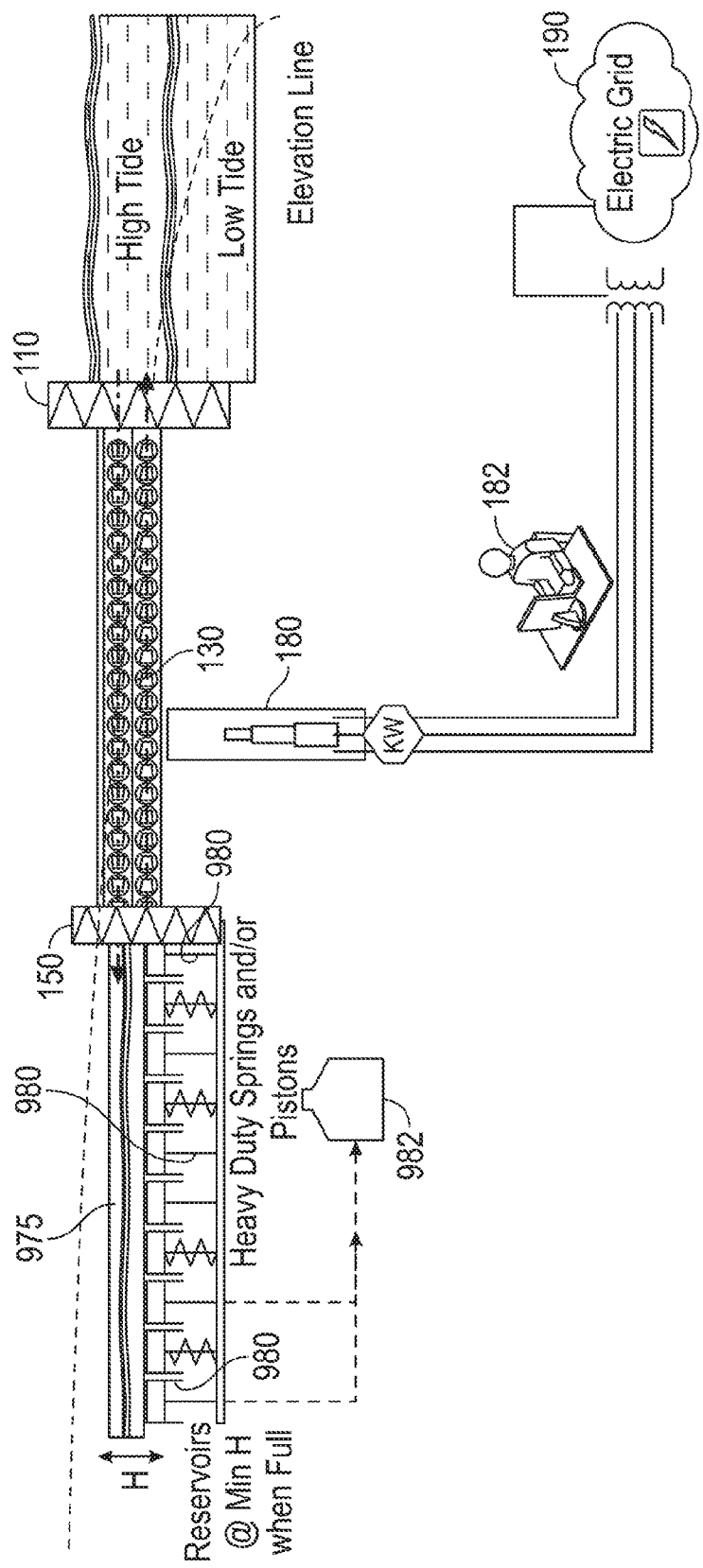
FIG. 9 is a schematic view of a third exemplary embodiment of an electrical generation system according to the present invention.

In an alternative exemplary embodiment of a system 400, shown FIG. 9, a reservoir 975 may be mounted on pistons 980. Pistons 980 may be in fluid communication with an accumulator tank 982 that absorbs fluid from pistons 980 as pistons 980 are compressed by the addition of tidal flow water into reservoir 975. The weight of the water in reservoir 975 overcomes pressure within pistons 980, compressing pistons 980. At low tide, as the tidal water flows out of reservoir 975, the pressure within pistons 980 overcomes the weight of the water in reservoir 975, expanding pistons 980, and raising reservoir 975 in order to optimize the head pressure of the water remaining within reservoir 975 as the water flows out to reservoir interface 150.

The fluid in pistons 980 and accumulator 982 may be air or liquid, such as, for example, hydraulic oil. If the fluid is a liquid, sufficient air is trapped in the top of accumulator 982 to compress and allow the liquid from pistons 980 to flow into accumulator 982.

While a single accumulator 982 is shown connected to a plurality of pistons 980, those skilled in the art will recognize that each piston 980 may incorporate its own accumulator 982. Further, although not shown, system 300 and 400 may use a plurality of separate reservoirs, similar to system 200.

Figure 10:
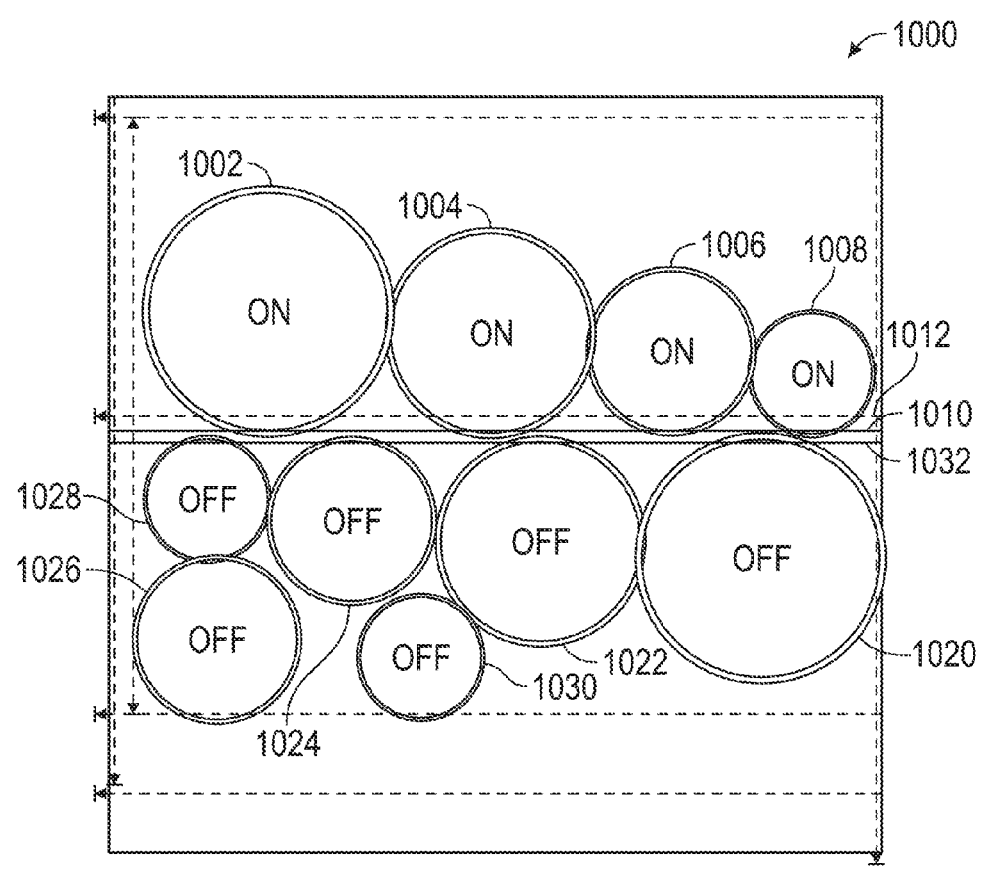
FIG. 10 is a front elevational view of an exemplary arrangement of a plurality of turbine inlet and outlet tubes according to the present invention.

In an alternative embodiment, shown FIG. 10, an electrical generation system 1000, according to the present invention can include a plurality of fluid inlet tubes 1002-1008 adjacent to each other, such that fluid inlet tubes 1002-1008 have different internal diameters. As shown in FIG. 10, fluid inlet tube 1002 has a largest diameter, while fluid inlet tube 1008 has a smallest diameter. A bottom internal portion of each of fluid inlet tubes 1002-1008 is located generally along the same horizontal plane 1010. Horizontal plane 1010 is located generally about the mid-tide line, shown as dashed line 1012 in FIG. 10 such that fluid inlet tubes 1002-1008 are disposed generally above mid-tide line 1012.

Electrical generation system 1000 also includes a plurality of fluid outlet tubes 1020-1030, at least some of which have different internal diameters. The plurality of fluid outlet tubes 1020-1030 is greater than the plurality of fluid inlet tubes 1002-1008. As shown FIG. 10, fluid outlet tube 1020 has a large diameter, while fluid outlet tube 1030 has a smallest diameter. A top internal portion of at least some of fluid outlet tubes 1020-1030 is located generally along the same horizontal plane 1032, which is located below horizontal plane 1010 and mid-tide line 1012.

The plurality of fluid outlet tubes 1020-1030 is greater than the plurality of fluid inlet tubes 1002-1008 in order to enable all of the tidal water that flows into system 1000 through fluid inlet tubes 1002-1008 during high tide to flow out of system 1000 through fluid outlet tubes 1020-1030 during low tide. As shown FIG. 10 at least some of fluid outlet tubes 1026, 1030 can be located vertically below other fluid outlet tubes 1022, 1024, 1028.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An electrical generation system based on tidal flow comprising:
   a reservoir;
   a plurality of fluid inlet tubes extending between a tidal source and the reservoir, wherein at least one of the plurality of fluid inlet tubes has a different internal diameter than another of the plurality of fluid inlet tubes, the plurality of inlet tubes each having at least one inlet turbine generator disposed therein; and
   a plurality of fluid outlet tubes extending between the reservoir and the tidal source, wherein at least one of the plurality of fluid outlet tubes has a different internal diameter than another of the plurality of fluid outlet tubes, the plurality of fluid outlet tubes each having at least one outlet turbine generator disposed therein;
   wherein, during a high tide at the tidal source, tidal fluid flows from the tidal source, into the fluid inlet tubes, past the at least one inlet turbine generator, and into the reservoir and during a low tide at the tidal source, the tidal fluid flows from the reservoir, into the fluid outlet tube, past the at least one outlet turbine generator, and to the tidal source.

2. The electrical generation system according to claim 1, wherein a bottom internal surface of each of the plurality of fluid inlet tubes extends generally along a horizontal plane.

3. The electrical generation system according to claim 1, wherein the fluid outlet tube comprises a plurality of fluid outlet tubes, such that the plurality of fluid outlet tubes is greater than the plurality of fluid inlet tubes.

4. The electrical generation system according to claim 1, wherein the reservoir comprises a plurality of reservoirs and wherein the tidal fluid flows into each of the plurality of reservoirs sequentially.

5. The electrical generation system according to claim 1, wherein the tidal source has a mid-tide line, and wherein the fluid inlet tubes are disposed generally above the mid-tide line.

6. The electrical generation system according to claim 5, wherein the fluid outlet tubes are disposed below the mid-tide line.

7. The electrical generation system according to claim 6, wherein the fluid inlet tubes and the fluid outlet tubes are vertically movable.

8. The electrical generation system according to claim 1, further comprising a reservoir interface providing fluid communication between the reservoir and both of the fluid inlet tube and the fluid outlet tube.

9. The electrical generation system according to claim 1, wherein the fluid inlet tube is vertically adjustable.

10. The electrical generation system according to claim 1, wherein the fluid inlet tube extends along a first level and the fluid outlet tube extends along a second level vertically lower than the first level.

11. The electrical generation system according to claim 9, further comprising a flushing reservoir located vertically above the first level and in fluid communication with at least one of the fluid inlet tube and the fluid outlet tube.

12. The electrical generation system according to claim 1, wherein a top internal surface of at least some of the plurality of fluid outlet tubes extends generally along a horizontal plane.

13. A method of generating electricity comprising:
   a. using the electrical generating system according to claim 1;
   b. allowing tidal flow into the fluid inlet tube after the tide at the tidal source raises the elevation of the tidal source above the top of the fluid inlet tube; and
   c. allowing tidal flow out of the reservoir after the tide at the tidal source lowers the elevation of the tidal source below the bottom of the fluid outlet tube.

14. The method according to claim 13, further comprising vertically adjusting the fluid inlet tube based on a maximum projected height of the tidal source.

15. The method according to claim 13, wherein the reservoir comprises a plurality of reservoirs, and wherein the method further comprises sequentially filling each of the plurality of reservoirs during step b and sequentially emptying each of the plurality of reservoirs during step c.

16. The method according to claim 13, wherein the fluid inlet tube comprises a plurality of fluid inlet tubes, and wherein step b comprises allowing the tidal flow through only one of the plurality of fluid inlet tubes.

17. The method according to claim 16, wherein the fluid outlet tube comprises a plurality of fluid outlet tubes, and wherein step c comprises allowing the tidal flow through some the plurality of fluid outlet tubes.

18. The method according to claim 13, further comprising vertically adjusting the reservoir during steps b and c.

19. An electrical generation system based on tidal flow comprising:
   a reservoir;
   a plurality of fluid inlet tubes extending between a tidal source and the reservoir, the plurality of inlet tubes each having at least one inlet turbine generator disposed therein; and
   a plurality of fluid outlet tubes extending between the reservoir and the tidal source, such that the plurality of fluid outlet tubes is greater than the plurality of fluid inlet tubes, the plurality of fluid outlet tubes each having at least one outlet turbine generator disposed therein;
   wherein, during a high tide at the tidal source, tidal fluid flows from the tidal source, into the fluid inlet tubes, past the at least one inlet turbine generator, and into the reservoir and during a low tide at the tidal source, the tidal fluid flows from the reservoir, into the fluid outlet tube, past the at least one outlet turbine generator, and to the tidal source.

20. The electrical generation system according to claim 19, further comprising a flushing reservoir adapted to receive and retain rainwater, the flushing reservoir being in fluid communication with each of the plurality of fluid inlet tubes and the plurality of fluid outlet tubes.

21. The electrical generation system according to claim 19, wherein at least one of the plurality of fluid outlet tubes is located vertically above another of the plurality of fluid outlet tubes.

* * * * *